V. OLSON.
TRAP SETTER.
APPLICATION FILED SEPT. 15, 1914.
1,145,789.
Patented July 6, 1915.
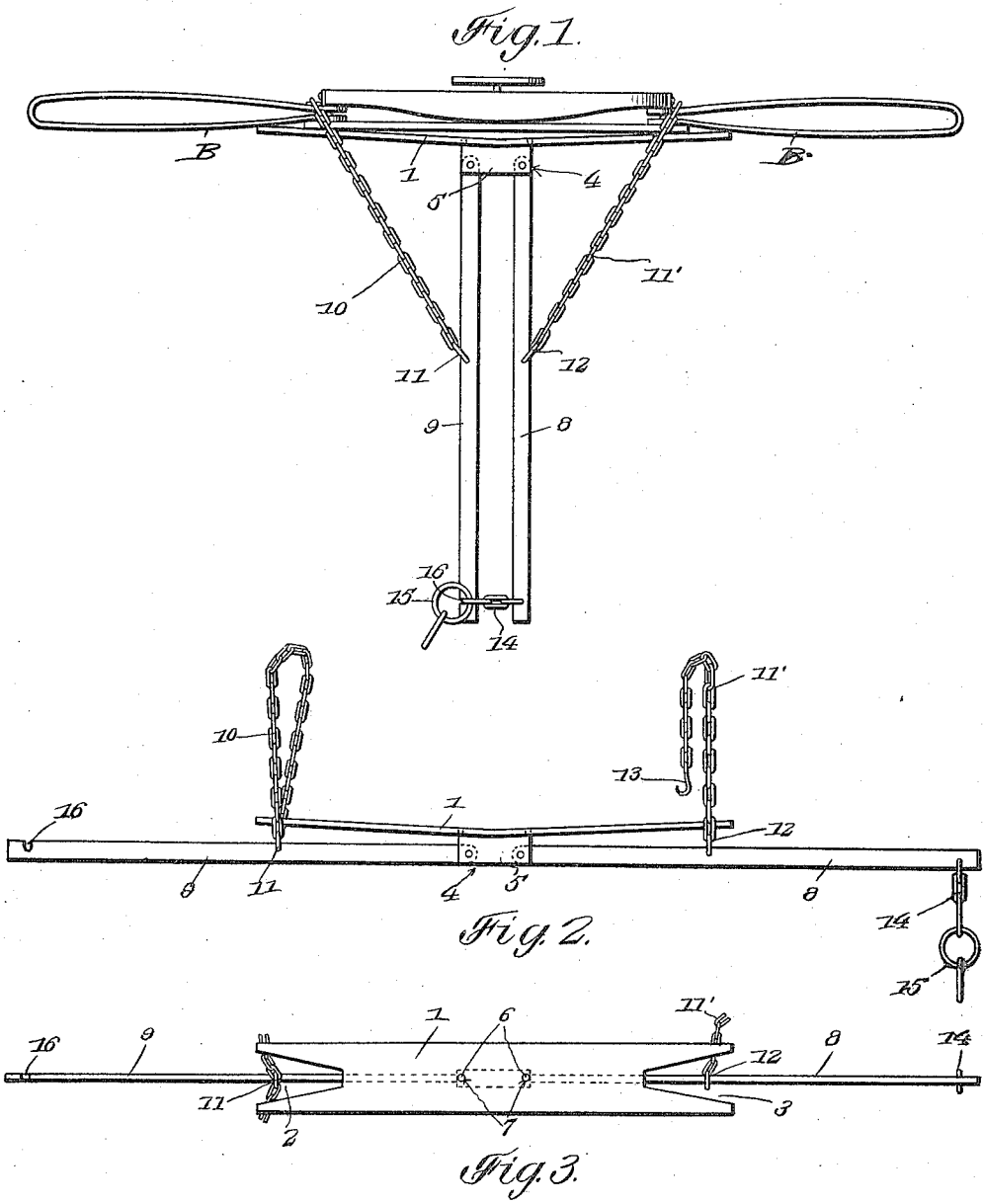
Witnesses
J. H. Crawford.
D. W. Gould.
Inventor
Viggo Olson,
By Victor J. Evans
Attorney

UNITED STATES PATENT OFFICE.

VIGGO OLSON, OF CALEDONIA, MINNESOTA.

TRAP-SETTER.

1,145,789.

Specification of Letters Patent.

Patented July 6, 1915.

Application filed September 15, 1914. Serial No. 861,875.

*To all whom it may concern:*

Be it known that I, VIGGO OLSON, a citizen of the United States, residing at Caledonia, in the county of Houston and State of Minnesota, have invented new and useful Improvements in Trap-Setters, of which the following is a specification.

The invention relates to an improvement in trap setters, and particularly to a construction through the use of which an ordinary trap may be readily and conveniently set without requiring the usual exertion and time for this purpose.

The main object of the present invention is the provision of a trap setter in which the parts are constructed for ready association and in which the operative elements are so correlated as to insure a comparatively easy manipulation of such parts in the use for which the device is designed.

The invention in the preferred form of details will be described in the following specification, reference being had particularly to the accompanying drawings, in which:—

Figure 1 is a perspective view of the improvement, showing the same in coöperative relation with the trap. Fig. 2 is a side elevation of the improved trap setter with the parts in inoperative position. Fig. 3 is a plan of the same.

The improved trap setter comprises a bed plate 1 having the respective portions thereof on opposing sides of the transverse medial line inclining slightly upwardly as shown. The respective ends of the bed plate are formed with slots, as 2 and 3, the side walls of which converge inwardly, as shown. A connector 4 is secured to the bed plate comprising a member having spaced depending walls 5 and upstanding spaced projections 6, the latter being designed to pass through correspondingly spaced opening 7 in the bed plate at equi-distance from and on opposite sides of the transverse line thereof, the projections being upset beyond the bed plate, the opening 7 being preferably countersunk to permit the practically flush connection. Setting levers 8 and 9 are pivotally supported between the depending walls 5 of the connector, levers normally extending in opposite directions from the connector and toward the respective ends of the base plate as shown. A chain 10 is arranged in the loop form having its terminal secured at 11 to the lever 9, the connection of the chain with the lever being such that the chain may rest in the slot 3 of the bed plate. A second chain 11 has one terminal secured at 12 to the opposing lever 8, the other terminal being free and provided with a hook 13. The end of the lever 8 is provided with a chain 14, the free end of which is made up of a series of rings 15, and the free end of the lever 9 is formed with a notch 16.

The application and use of the improvement will be apparent from Fig. 1 of the drawings.

By the use of the improved trap setter, both springs of the trap are pressed down at once, thereby insuring speedy and convenient setting, the connection of the chain 11' at one terminal only providing for the use of this chain at that end of the trap with which the ordinary trap chain is connected, thereby enabling the trap to be set after the trap chain has been attached to the convenient fixture as is usually the case.

It will of course be appreciated by those versed in the art, that this setter is particularly adapted for animal traps, and the like which are provided with the usual springs designated at B in Fig. 1 of the drawing. When it is desired to set the trap, one of the springs B, in this particular instance, the spring shown to the left of Fig. 1 of the drawing, is inserted through the closed loop or chain 10 and the chain 11' is brought over the opposite spring of the trap and its hook 13 is fastened within one of the links of the chain 11', this being accomplished the setting levers 8 and 9 are drawn downward in the position shown in Fig. 1 of the drawing and locked together through the medium of the chain 14 engaging the notch 16. After this operation has been accomplished, a slight inward pressure is exerted on the setting levers 8 and 9, the chain 14 disengaged from the notch 16, the hook 13 disengaged from one of the links of the chain 11' and the opposite chain 11 is slipped off of its spring B, and the trap is set without injury to the operator.

What is claimed is:—

1. A trap setter including a base plate, setting levers pivotally connected thereto, and trap engaging chains connected to the levers, one of said chains being connected to its lever in loop form and the other chain being connected to the lever at one terminal only.

2. A trap setter including a base plate, levers pivotally connected thereto, setting chains connected to the respective levers, one of said chains being of permanent loop form, the ends of the base plate being formed with slots to permit passage of the chains therethrough.

3. A trap setter including a base plate, levers pivotally connected thereto, setting chains connected to the respective levers, one of said chains being of permanent loop form, the ends of the base plate being formed with slots to permit passage of the chains therethrough, the base plate having its portions on opposing sides of the transverse median line inclined upwardly from said line.

4. A trap setter including a base plate, levers pivotally connected thereto, setting chains connected to the respective levers, one of said chains being of permanent loop form, the ends of the base plate being formed with slots to permit passage of the chains therethrough, and means for connecting the free ends of the levers.

5. A trap setter including a base plate, levers pivotally connected thereto, setting chains connected to the respective levers, one of said chains being of permanent loop form, the ends of the base plate being formed with slots to permit passage of the chains therethrough, and means for adjustably connecting the free ends of the levers.

In testimony whereof I affix my signature in presence of two witnesses.

VIGGO OLSON.

Witnesses:
  B. E. LILLY,
  FRANCES McINTIRE.

Copies of this patent may be obtained for five cents each, by addressing the "Commissioner of Patents, Washington, D. C."